(12) United States Patent
Popp et al.

(10) Patent No.: US 7,654,931 B2
(45) Date of Patent: Feb. 2, 2010

(54) METHOD FOR OPERATING A DRIVE TRAIN

(76) Inventors: Christian Popp, Kummertsweiler 8, Kressbronn (DE) 88079; Bernd Allgaier, Altmannweg 12, Kressbronn (DE) 88079; Heinrich Zeller, Eisvogelweg 7, Friedrichshafen (DE) 88048

( * ) Notice: Subject to any disclaimer, the term of this patent is extended or adjusted under 35 U.S.C. 154(b) by 355 days.

(21) Appl. No.: 11/774,162

(22) Filed: Jul. 6, 2007

(65) Prior Publication Data
US 2008/0064560 A1    Mar. 13, 2008

(30) Foreign Application Priority Data
Jul. 8, 2006    (DE) .................. 10 2006 031 683

(51) Int. Cl.
*B60W 10/02* (2006.01)
(52) U.S. Cl. ................ 477/4; 477/5; 477/170; 477/172; 477/173
(58) Field of Classification Search .......... 477/2–6, 477/170, 173
See application file for complete search history.

(56) References Cited

U.S. PATENT DOCUMENTS

| | | | |
|---|---|---|---|
| 7,222,014 B2 * | 5/2007 | Tao et al. ............... | 701/87 |
| 7,264,570 B2 * | 9/2007 | Heap et al. ............. | 477/3 |
| 7,315,774 B2 * | 1/2008 | Morris ................... | 701/53 |
| 7,343,993 B2 * | 3/2008 | Dong et al. ............. | 180/65.23 |
| 2005/0221947 A1 | 10/2005 | Mesiti et al. | |

FOREIGN PATENT DOCUMENTS

| DE | 199 45 474 A1 | 9/1999 |
|---|---|---|
| EP | 13 52 775 A2 | 10/2003 |

* cited by examiner

*Primary Examiner*—Ha D. Ho
(74) *Attorney, Agent, or Firm*—Davis & Bujold, P.L.L.C.

(57) ABSTRACT

A method of operating a drive train of a motor vehicle with a hybrid drive having an internal combustion engine, an electric motor, an automatic transmission. The drive train also having a clutch between the internal combustion engine and the electric motor, and a clutch or a torque converter between the electric motor and the automatic transmission. This arrangement enabling the internal combustion engine to be started by engaging the clutch arranged between the internal combustion engine and the electric motor, when the drive train is powered exclusively by the electric motor. The braking power, generated during an upshift in response to a drop in the rotational speed of the drive train components, is used to start the internal combustion engine, such that the energy required from the electric motor for starting the combustion engine is minimized.

8 Claims, 6 Drawing Sheets

METHOD FOR OPERATING A DRIVE TRAIN

This application claims priority from German patent application serial no. 10 2006 031 683 5 which was filed Jul. 8, 2006.

FIELD OF THE INVENTION

The invention relates to a method for operating a motor vehicle drive train comprising at least one automatic transmission and a hybrid drive.

BACKGROUND OF THE INVENTION

The main components of a drive train of a motor vehicle am a drive unit and a transmission. A transmission converts torque and rotational speeds into the driving force of the drive unit. The present invention relates to a method for operating a drive train that comprises at least one automatic transmission and a hybrid drive for the power plant.

US 2005/0221947 A1 discloses a method for operating a motor vehicle drive train comprising at least one automatic transmission and a hybrid drive, where a clutch is arranged between a combustion engine of the hybrid drive and an electric motor of the hybrid drive, and another clutch is arranged between the electric motor of the hybrid drive and the automatic transmission. When the drive train is driver's exclusively by the electric motor of the hybrid drive, the internal combustion engine of the hybrid drive can be started, according to the prior art, by closing the clutch arranged between the internal combustion engine and electric motor of the hybrid drive, while the automatic transmission of the drive train is upshifting. According to US 2005/0221947 A1, the electric motor of the hybrid drive starts the internal combustion engine of the hybrid drive, causing a change in rotational speed of the transmission output of the automatic transmission, which the driver usually perceives as a disturbance.

Starting from here, the object of the present invention is to provide a method for operating a drive train comprising an automatic transmission and a hybrid drive, where staging of the internal combustion engine is virtually undetectable.

SUMMARY OF THE INVENTION

According to the invention, braking energy generated during upshifting in response to a drop in the rotational speed of the drive tram components is used to start the internal combustion engine so that the energy required from the electric motor for starting the combustion engine is minimized.

The present invention represents the first time that the option of starting the internal combustion engine of a hybrid drive train by using the braking energy generated during upshifting has been proposed. Through this method, the energy required from the electric motor for starting the internal combustion engine can be minimized, so virtually no change in torque is detectable at the transmission output of the automatic transmission, such that starting the internal combustion engine is unnoticeable to the driver.

In particular, the braking energy is used for starting the internal combustion engine, and is generated following the drop in the rotational speed of the drive train components, constituting a section of the drive train, which stretches from the output end of the clutch arranged between the internal combustion engine and the electric motor to the input side of a shifting component of the automatic transmission engaged during upshifting.

The internal combustion engine is preferably started during an upshift in such a way that the rotational speed of the internal combustion engine equals the input rotational speed of the automatic transmission by the end of the upshift.

In an advantageous refinement of the invention, the braking energy available following the drop in rotational speed of the drive train components and the energy needed for starting the internal combustion engine are calculated and compared, whereupon if the energy required for starting the internal combustion engine is greater than the braking energy available, starting the internal combustion engine start is assisted by a pressure increase of the clutch arranged between the internal combustion engine and the electric motor and/or by a pressure increase of an automatic transmission shifting component engaged during upshifting and/or by an increase in electric motor torque.

BRIEF DESCRIPTION OF THE DRAWINGS

Preferred embodiments of the invention are described in the following description. Examples of the invention are described with the aid of the drawings without being limited thereto. Shown in.

DETAILED DESCRIPTION OF THE PREFERRED EMBODIMENTS

The present invention relates to a method for operating a motor vehicle drive train that comprises at least an automatic transmission and hybrid drive. A hybrid drive comprises an internal combustion engine and an electric motor.

Figure 1:
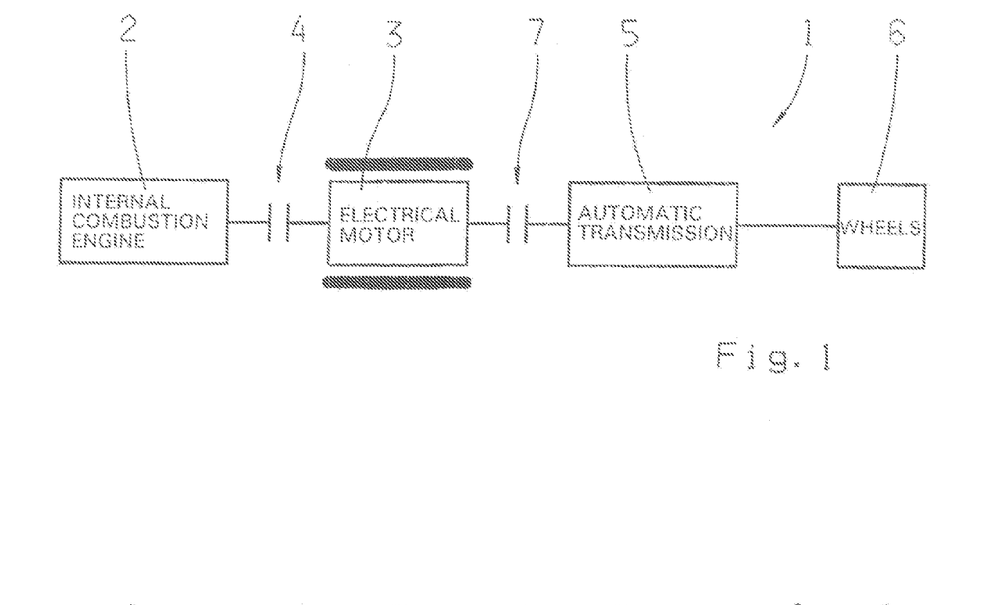
FIG. 1 is a drat diagram of a drive train for a motor vehicle.

FIG. 1 shows a diagram of a motor vehicle drive train 1, where the drive train, illustrated in FIG. 1, comprises a hybrid drive, which in turn comprises an internal combustion engine 2 and an electric motor 3. Connecting the internal combustion engine 2 and the electric motor 3, is a first clutch 4, which is disengaged when the drive train 1 is powered exclusively by the electric motor 3. In addition to the hybrid drive, the drive train, illustrated in FIG. 1, comprises an automatic transmission 5, which redirects the driving force, generated by the hybrid drive, to the drive train wheels 6 to be powered. The automatic transmission 5 comprises multiple shifting components, which can be controlled for changing gears. According to FIG. 1, an additional second clutch 7 is connected between the electric motor 3 of the hybrid drive and the automatic transmission 5.

Figure 2:
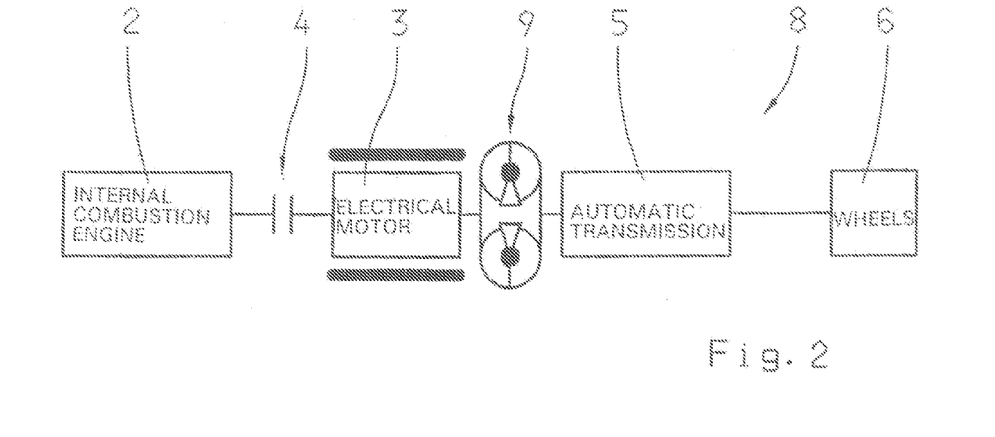
FIG. 2 is a second diagram of a drive train for a motor vehicle.

FIG. 2 is another diagram of a drive train 8 of a motor vehicle, where the drive train, illustrated in FIG. 2, is distinguished from the drive train, illustrated in FIG. 1, only by the fact that a torque convert 9, instead of a clutch, to connected between the electric motor 3 of the hybrid drive and the automatic transmission 5. Otherwise, the drive train diagram, shown in FIG. 2, is identical to the drive train diagram, shown in FIG. 1. To avoid unnecessary repetition, the same reference numbers are used for identical assemblies. Drive trains illustrated in FIGS. 1 and 2 are called parallel-hybrid-drive trains.

If a drive train, as illustrated in FIG. 1 or 2, is powered exclusively by the electric motor 3 of the hybrid drive when the clutch 4 is disengaged, if may be necessary, under certain operating conditions, to start the internal combustion engine 2 of the hybrid drive by engaging the clutch 4, connected between the internal combustion engine 2 and the electric motor 3 of the hybrid drive.

To render the internal combustion start virtually undetectable to the driver, the present invention proposes, starting the internal combustion engine 2 by engaging the clutch 4 during an upshift of the automatic transmission, namely in such a way that braking energy generated following the drop in rotational speed of drive train components, during the process of upshifting, is used to start the internal combustion engine 2 of the hybrid drive so that the electric motor 3 energy needed for starring the internal combustion engine 2 is minimized. An upshift is a gear change from a starting gear with a lower gear ratio to a target gear with a higher gear ratio.

The energy for starting the internal combustion engine is supplied at least partly from the rotating masses of the drive train components, which are to be decelerated through the drop in rotational speed caused by upshifting. This process concerns the drive train components forming a segment thereof extending from the output side of the clutch 4, arranged between the internal combustion engine 2 and the electric motor 3, to the input side of shifting element of the automatic transmission 5 to be engaged during the upshift. The switching element of the automatic transmission 5 to be engaged during the upshift can be a clutch or a brake, integrated into the automatic transmission 5.

Figure 3:
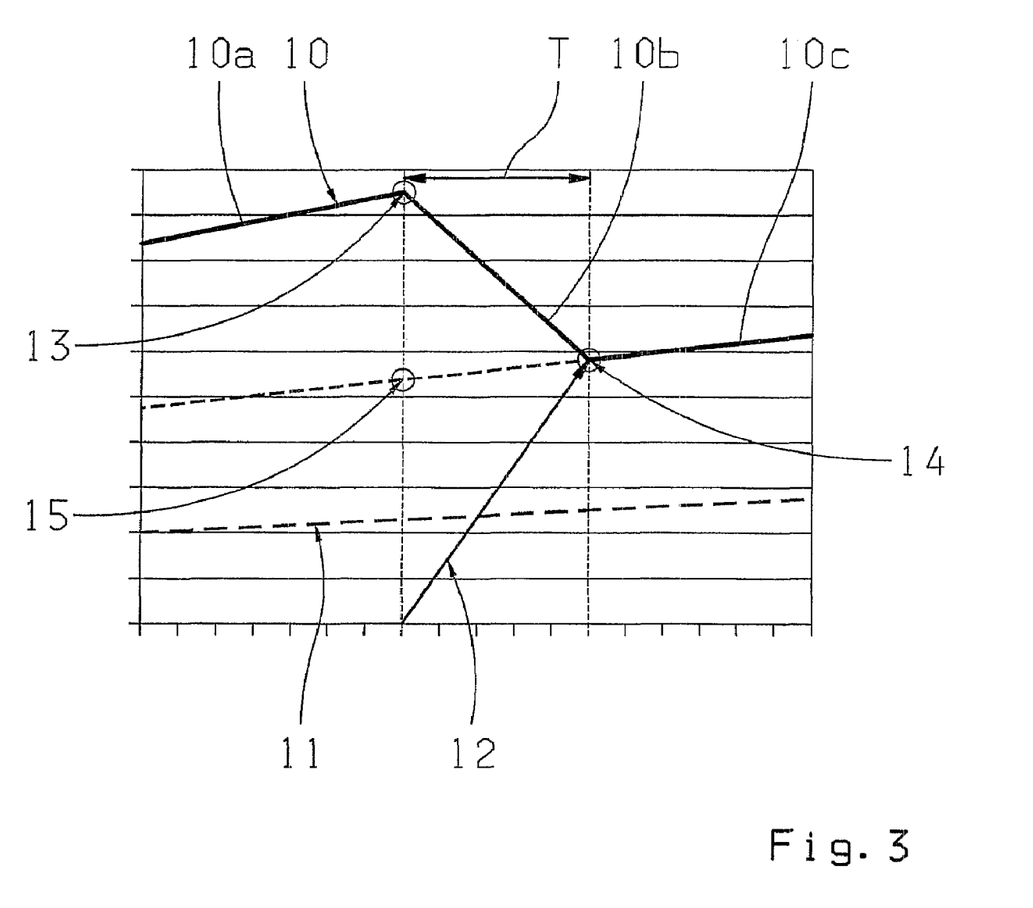
FIG. 3 is a schematic diagram to illustrate the inventive method for operating a motor vehicle drive train.

Rotational speed patterns over time arising when the inventive method is executed are schematically illustrated in FIG. 3, where a signal pattern over time 10 visually represents the rotational speed of the transmission input of the automatic transmission 5, a signal pattern overtime 11 visually represents the rotational speed of the transmission output of the automatic transmission 5 and a signal pattern over time 12 visually represents the rotational speed of the internal combustion engine 2, when the inventive method is executed. The signal pattern 10, which visually represents the rotational speed of the transmission input of the automatic transmission 5, is basically divided into three segments 10a, 10b and 10c, where section 10a of the signal pattern 10 visually represents a rotational speed pattern of the transmission input of the automatic transmission 5 on the starting gear of an upshift signal pattern 10c visually represents the rotational speed pattern of the transmission input of the automatic transmission 5 on the target gear of the upshift and segment 10b visually represents the rotational speed pattern of the transmission input of the automatic transmission 5 during the upshift from the starting gear to the target gear.

The rotational speed present at point 13 equals the rotational speed of the transmission input of the automatic transmission 5 on the starting gear immediately before the upshift, while the rotational speed visually represented by point 14 equals the rotational speed of the transmission input of the automatic transmission 5 on the starting gear immediately after the upshift. A time span T defined between points 13 and 14 corresponds to the time necessary for executing the upshift, where originally still internal combustion engine 2 must be started according to the signal pattern 12 during this time span T, so that the rotational speed of the internal combustion engine 2 equals the input rotational speed of the automatic transmission by the completion of the upshift at point 14. The rotational speed of the internal combustion engine 2 must reach the input rotational speed of the automatic transmission 5 no later than when the input rotational speed of the automatic transmission 5 equals the synchronous rotational speed of the target gear of the upshift.

Point 15, in FIG. 3, visually represents the theoretical rotational speed of the transmission input of the automatic transmission 5 that would be present immediately before upshifting, if the target gear were engaged.

In connection with FIG. 3, it is suggested that FIG. 3 represents the ideal case in which, the rotational speed of the internal combustion engine 2 equals the input relational speed of the automatic transmission 5, when the input rotational speed of the automatic transmission 5 equals the synchronous rotational speed of the target gear of the upshift procedure. As was already mentioned, the rotational speed of the internal combustion engine 2 can, however, reach the inner rotational speed of the automatic transmission 5 before the moment at which the input rotational speed of the automatic transmission 5 equals the synchronous rotational speed of the target gear of the upshift.

Figure 4:
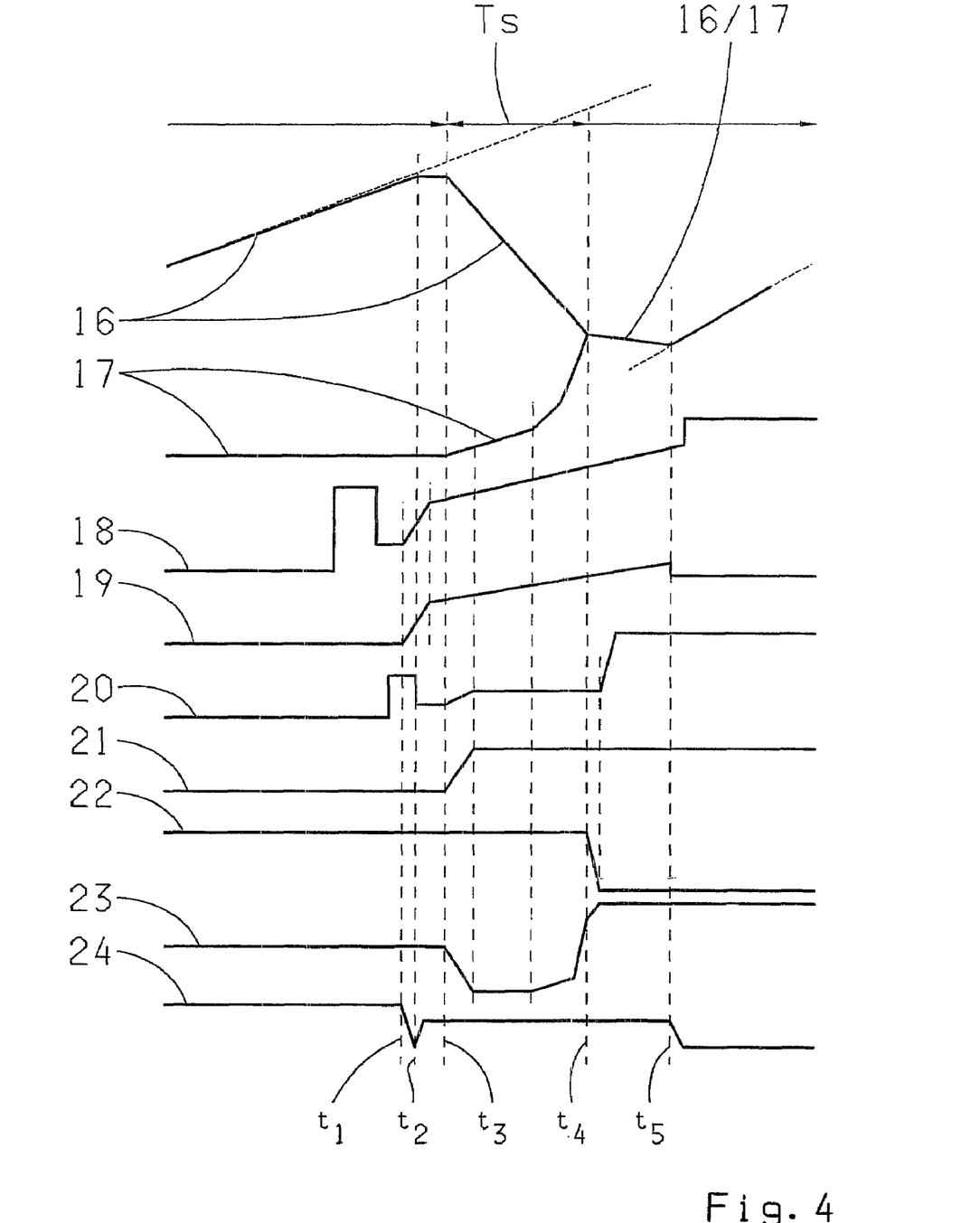
FIG. 4 is a first detailed graph to illustrate the inventive method for operating a drive train of a motor vehicle.

FIG. 4 illustrates in greater detail the signal patterns over time arising when the inventive method is executed, where a signal pattern ever time 16 visually represents a rotational speed pattern of the transmission input of five automatic transmission 5, a signal pattern ever time 17 visually represents a motor rotational speed, a signal pattern overtime 18 visually represents the pressure behavior or the target pressure behavior of a shifting element of the automatic transmission 5 to be engaged during the upshift, a signal pattern over time 19 visually represents the torque of the shilling element of the automatic transmission 5 to be engaged during the upshift, a signal pattern over time 20 visually represents the pressure of the clutch 4 and a signal pattern over time 21 visually represents the torque of the clutch 4, and the signal pattern over time 22 visually represents the torque generated by the electric motor 3 of the hybrid drive, the signal pattern over time 23 visually represents the torque generated by the internal combustion engine 2 of the hybrid drive and the signal pattern over time 24 visually represents the torque of the transmission output of the automatic transmission. For simplicity, the pressure pattern of the shifting element of the automatic transmission to possibly be disengaged during the upshift is not illustrated in FIG. 4.

At point in time $t_1$ the shifting element of the automatic transmission 5 to be engaged during the upshift moves from a charging phase or charge-adjusting phase to a shifting phase, as the signal pattern 18 illustrates, where, as a result, the rotational speed of the transmission input of the automatic transmission 5 is disconnected from the synchronous rotational speed of the starting gear of the upshift at point in time $t_2$, as signal pattern 16 illustrates. At the point in time $t_3$, the internal combustion engine 2 is coupled to the electric motor, as a result of the clutch moving from the charging phase or charge adjustment phase, as signal pattern 20 represents, starting at the point in time $t_3$, the rotational speed of the internal combustion engine 2 is increased, as illustrated by signal pattern 17, so that at the point in time $t_4$, the rotational speed of the internal combustion engine equals the rotational speed at the transmission input of the automatic transmission 5. As signal pattern 23 illustrates, the internal combustion engine 2 first generates a negative torque, which becomes positive only after overcoming the so-sailed coasting torque for the internal combustion engine 2. The rotational speed of the internal combustion engine 2 has readied the input rotational speed of the automatic transmission 5 at the point in time $t_4$, in FIG. 4 the point in time $t_4$ is before the point in time $t_5$, at which the input rotational speed of the automatic transmission equals the synchronous rotational speed of the target gear of the upshift.

The time span defined by the points in time $t_1$ and $t_5$ corresponds to the time span T from FIG. 3, which is needed for the upshift where, in the embodiment illustrated in FIG. 2, the internal combustion engine 2 is started and accelerated to the input rotational speed of the automatic transmission 6 within the time span $T_s$ defined by points in time $t_3$ and $t_4$. The internal combustion engine 2 of the hybrid drive is shut off before time span $T_s$, whereas after time span $T_s$ the internal combustion engine 2 is engaged to the automatic transmission, following completion of the start procedure.

Figure 5:
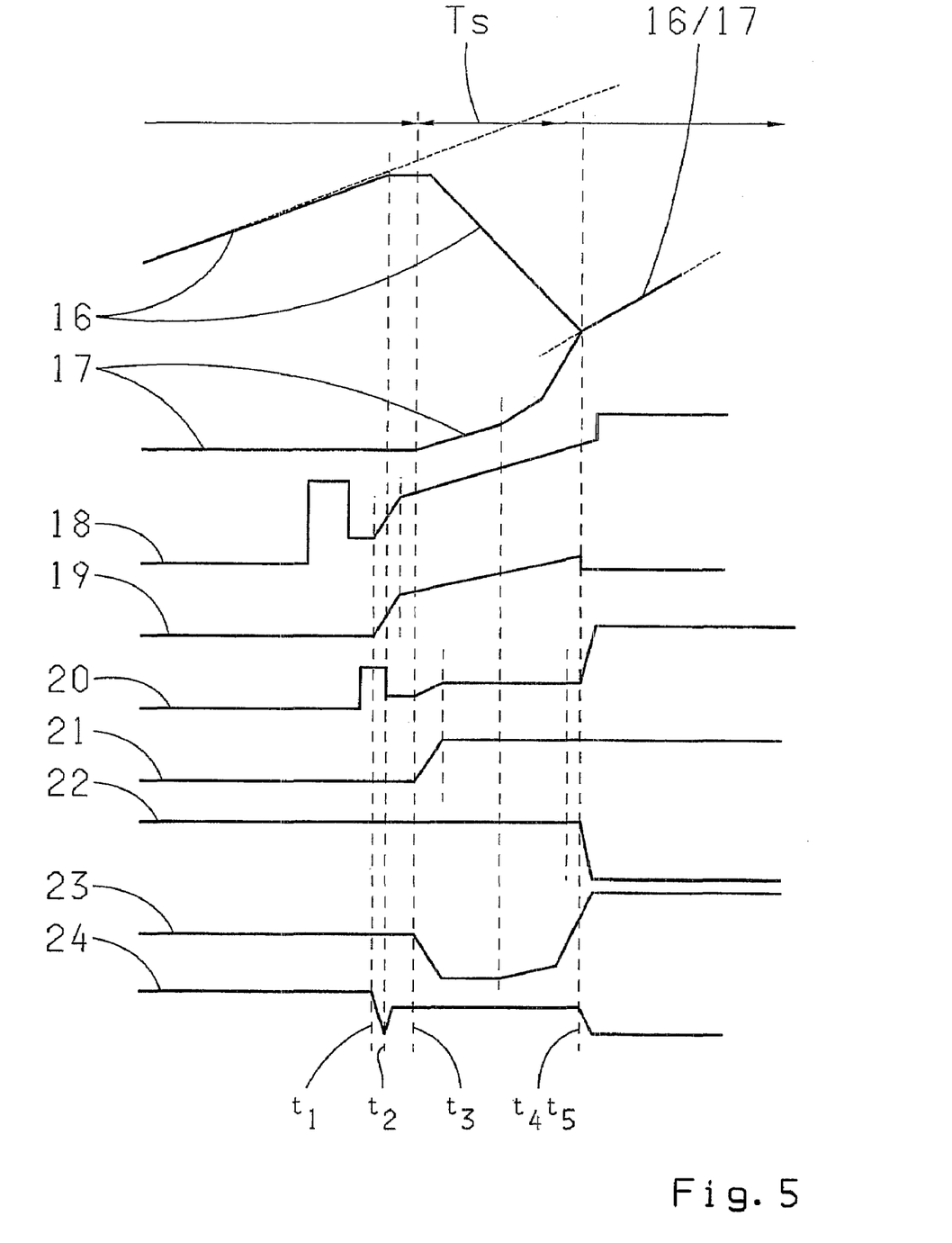
FIG. 5 is a second detailed graph to illustrate the inventive method for operating a drive train of a motor vehicle.

In ideal cases, the points in time $t_4$ and $t_5$ coincide, so that the rotational speed of the internal combustion engine 2 reaches the input rotational speed of the automatic transmission 5 exactly at the point in tree at which the input rotational speed of the automatic transmission corresponds to the synchronous rotational speed of the target gear of the upshift. This ideal ease is illustrated in FIG. 5, where FIG. 5 differs from FIG. 4 only in the fact that in FIG. 5 the points in time $t_4$ and $t_5$ coincide.

As was already mentioned, braking energy, generated from the components of the drive train as a result of the drop in rotational speed during the upshift, is used to start the internal combustion engine 2 of the hybrid drive during the upshift. This braking energy that can be generated by the components of the drive train is preferably calculated before hand, as is the energy needed for starting the internal combustion engine 2. These calculated energies are then compared with one another.

If tills comparison determines that the energy needed for starting the internal combustion engine 2 is greater than the braking energy generated from the drop in rotational speed during the upshift, the start of the combustion engine is assisted by appropriate measures, namely a pressure increase of the clutch 4 arranges between the internal combustion engine 2 and the electric motor 4 and/or a pressure increase of a shifting element of the automatic transmission 5 to be engaged during the upshift and/or increased torque from the electric motor 3 of the hybrid drive.

Figure 6:
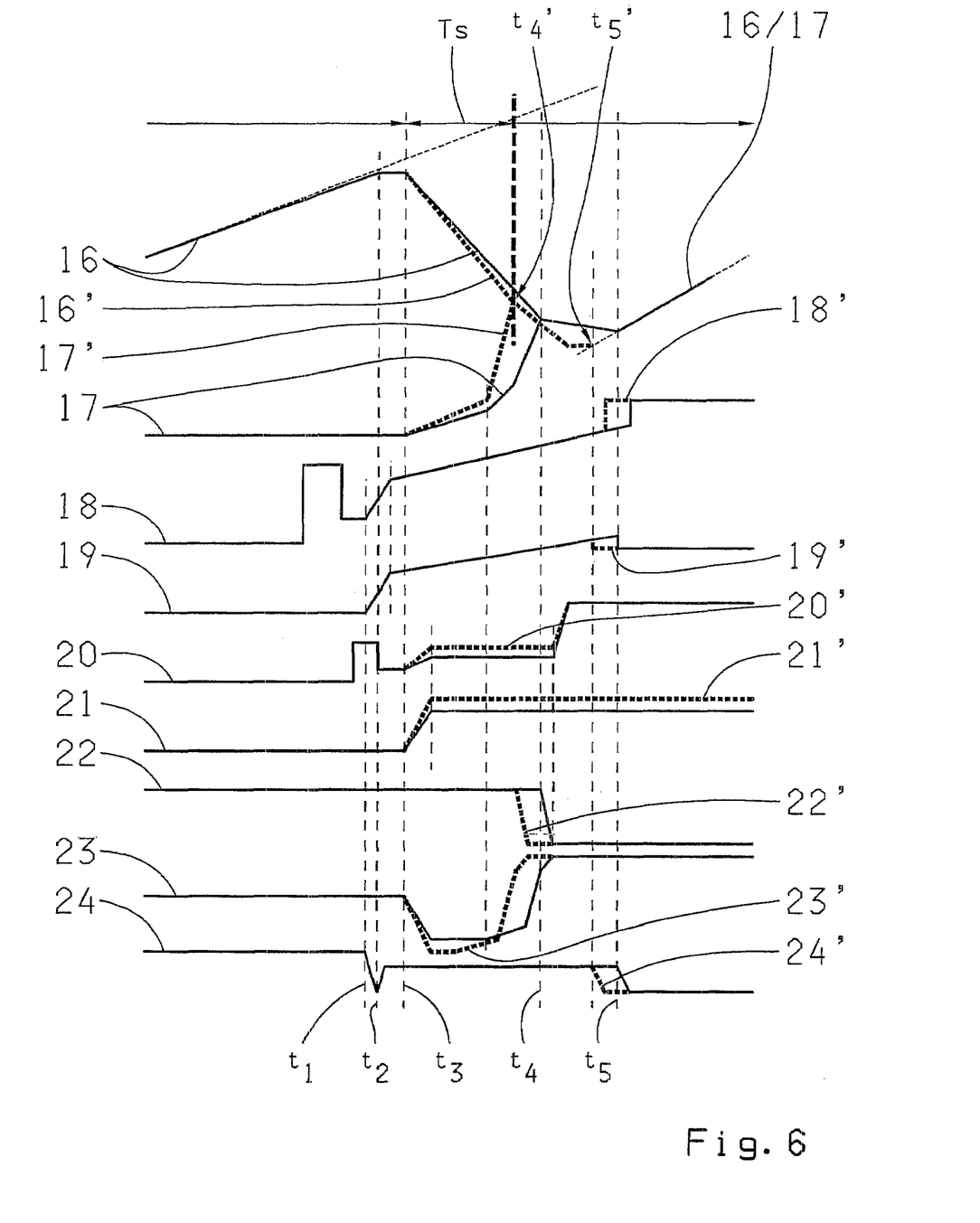
FIG. 6 is a third detailed graph to illustrate the inventive method for operating a drive train of a motor vehicle and FIG. 7 is a fourth detailed graph to illustrate the inventive method for operating a drive tram of a motor vehicle.

In comparison to FIG. 4, FIG. 6 visually represents the effects on the signal patterns over time 16 to 24, which result when pressure is increased on the clutch 4 arranged between the internal combustion engine 2 and the electric motor 3 to assist starting the internal combustion engine 2.

As FIG. 6 illustrates, pressure is increased on the clutch 4 at the point in time $t_3$ which the clutch passes to the shifting phase, as signal pattern 20' illustrates. The torque 21' present is increased accordingly. As signal patterns 16' and 17' show, this results in increasing the gradients of the transmission input rotation speed patterns as well as the internal combustion engine rotational speed patterns so that the rotational speed of the internal combustion engine 2 reaches the rotational speed of the transmission input already at the point in time $t'_4$, which is located before the point in time $t_4$ in FIG. 4. The synchronous rotational speed of the target gear is also reached already at the point in time $t'_5$, which is located before the point in time $t_5$ in FIG. 4, thereby allowing both the time span $T_s$, needed for starting the internal combustion engine, and the shifting time of the downshift to be decreased by applying increased pressure at the clutch 4 arranged between the internal combustion engine 2 and the electric motor 3. As FIG. 6 illustrates, the pressure increase of the clutch 4 has further effects on the signal patterns 18, 19, 22, 23 and 24. These effects are labeled with the reference numbers 18', 19', 22', 23' and 24' in FIG. 6.

Figure 7:
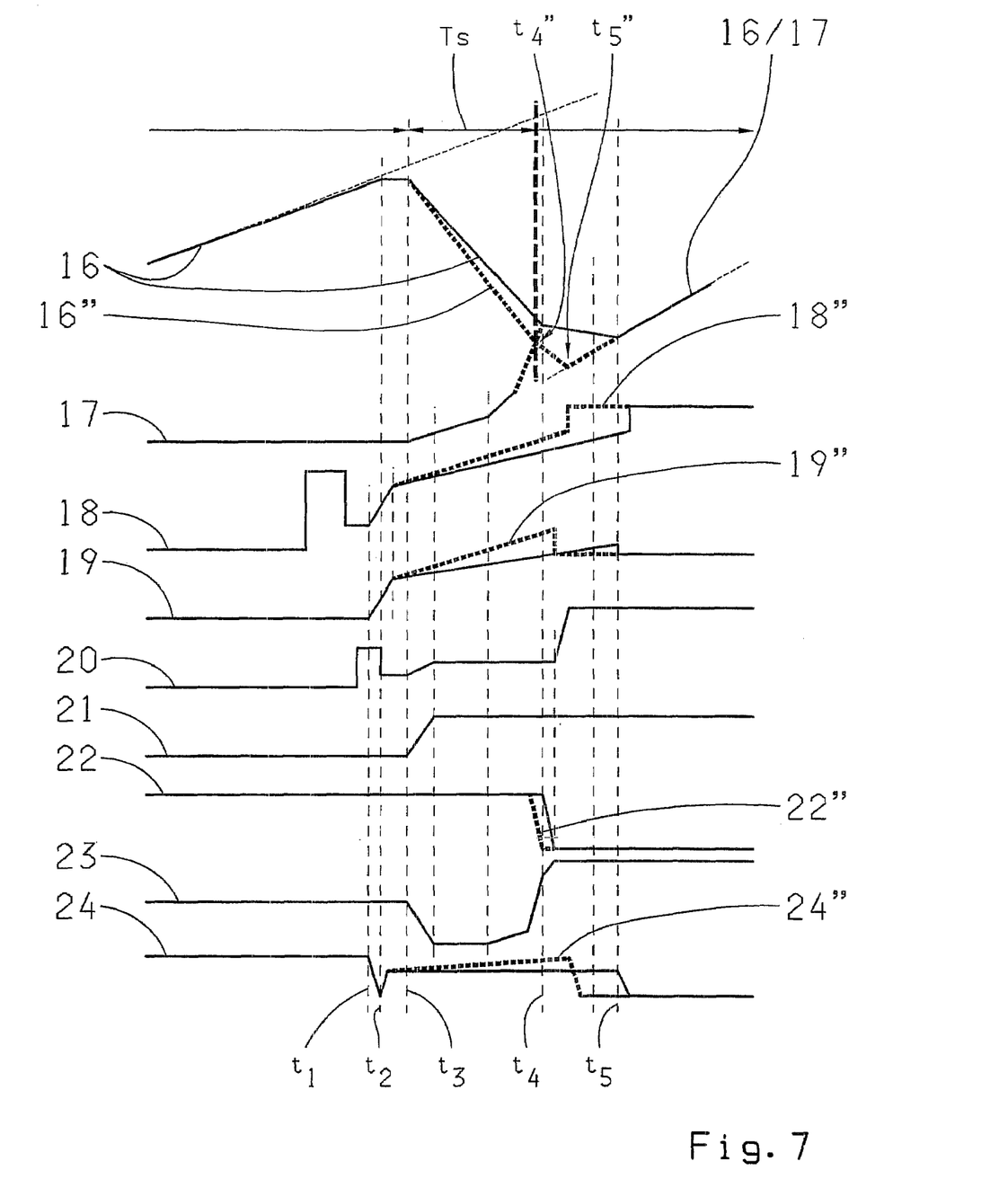

FIG. 7 visually represents the effects on the signal patterns over time from FIG. 4, when pressure is increased on a switching element of the automatic transmission 5 to be engaged during the upshift for the purpose of assisting the start of the internal combustion engine. As signal pattern 18" shows, pressure is increased at the shifting element of the automatic transmission 5 to be engaged during upshifting, whereupon this shifting element can transmit a greater torque, as signal pattern 19" illustrates. As the signal pattern 16" shows, the gradient of the transmission input rotational speed is increased so that the engine rotational speed, in turn, reaches the transmission input rotational speed, at an earlier point in time $t"_4$. The time needed for starting the internal combustion engine is accordingly reduced compared to FIG. 4.

The time needed for the upshift is also reduced, since the point in time to is located before the corresponding point in time $t_5$, in FIG. 4. The pressure increase on the shifting element of the automatic transmission to be engaged during the upshift also has effects on the signal patterns 22 and 24 as the signal patterns labeled 22" and 24" in FIG. 7 illustrate.

As has already been stated above, FIG. 6 shows starting the internal combustion engine 2 is supported by a pressure increase of the clutch 4 arranged between the internal combustion engine 2 and the electric motor 3, while FIG. 7 shows the internal combustion engine 2 stab being assisted by a pressure increase at the shifting component of the automatic transmission 5 to be engaged during upshifting. Both of these measures can also be used in combination with one another. It is also possible to increase the electric motor torque 3 in combination with one or both of these measures or alone to assist the internal combustion engine start.

If a comparison of the calculated braking energy and the energy needed for starting the internal combustion engine determines that the energy needed for starting the internal combustion engine is smaller than the braking energy that can be generated, the torque of the internal combustion engine and/or the electric motor is reduced when shifting is completed, following the point in time at which the rotational speed of the internal combustion engine 2 has reached the input rotational speed of the automatic transmission 5.

REFERENCE NUMBERS

1 Drive train
2 Internal combustion engine
3 Electric rector
4 Clutch
5 Automatic transmission
6 Wheel
7 Clutch
8 Drive train
9 Torque converter
10 Signal pattern
10a, 10b, 10c Signal pattern segment
11 Signal pattern
12 Signal pattern
13 Point
14 Point
15 Point
16, 16', 16" Signal pattern
17, 17', Signal pattern
18, 18', 18" Signal pattern
19, 19', 19" Signal pattern
20, 20' Signal pattern
21, 21' Signal pattern
22, 22', 22" Signal pattern 23, 23' Signal pattern
24, 24', 24" Signal pattern

The invention claimed is:

1. A method of operating a motor vehicle drive train having a hybrid drive including:
an internal combustion engine,
an electric motor and an automatic transmission,
a first clutch being arranged between the internal combustion engine and the electric motor, and
one of a second clutch and a torque converter being arranged between the electric motor and the automatic transmission such that when the drive train is powered exclusively by the electric motor, the internal combustion engine is started by engagement of the first clutch, the method comprising the steps:
generating braking energy, during an upshift, by reducing a rotational speed of drive train components; and
utilizing the braking energy to start the internal combustion engine such that energy required from the electric motor, for starting the internal combustion engine, is one of reduced and minimized.

2. The method according to claim 1, further comprising the step of, during the upshift, generating the braking energy by reducing the rotational speed of a segment of the drive train, extending from an output end of the first clutch to an input side of an engaged shifting component of the automatic transmission.

3. The method according to claim 1, further comprising the step of starting the internal combustion engine, during the upshift, such that a rotational speed of the internal combustion engine is equal to an input rotational speed of the automatic transmission before completion of the upshift.

4. The method according to claim 3, further comprising the step of equalizing the rotational speed at the internal combustion engine to the input rotational speed of the automatic transmission before the input rotational speed of the automatic transmission is equal to a synchronous rotational speed of a target gear of the upshift.

5. The method according to claim 3, further comprising the step of equalizing the rotational speed of the internal combustion engine to the input rotational speed of the automatic transmission at a point in time when the input rotational speed of the automatic transmission is equal to a synchronous rotational speed of a target gear of the upshift.

6. The method according to claim 1, further comprising the step of calculating and comparing an amount of available braking energy capable of being generated by the reduction of the rotational speed of the drive train components and energy required for starting the internal combustion engine, if the energy required for starting the internal combustion engine is greater than the available braking energy, then at least one of a pressure increase at the first clutch, a pressure increase at a shifting component of the automatic transmission which is engaged during the upshift and an increase of torque in the electric motor, is utilized to assist the electric motor with starting the internal combustion engine.

7. The method according to claim 1, further comprising the step of calculating and comparing an amount of available braking energy capable of being generated by the reduction of the rotational speed of the drive train components and energy required for starting the internal combustion engine, if the energy required for starting the internal combustion engine is less than the available braking energy, then at least one of torque of the internal combustion engine and torque of the electric motor is reduced after the rotational speed of the internal combustion engine at least approximately matches an input rotational speed of the automatic transmission.

8. A method of operating a motor vehicle drive train having a hybrid drive with an internal combustion engine, an electric motor and an automatic transmission, the method comprising the steps of:
arranging a first clutch, in the drive train, between the internal combustion engine and the electric motor, to optionally engage and disengage the internal combustion engine and the electric motor;
arranging one of a second clutch and a torque converter, in the drive train, between the electric motor and the automatic transmission to optionally engage and disengage the electric motor and the automatic transmission;
powering the drive train exclusively with the electric motor;
generating braking energy, by reducing a rotational speed of at least one drive train component, during a shift in the transmission from a gear to a higher gear;
engaging the first clutch; and
supplying the internal combustion engine with the braking energy; and
if necessary, providing the internal combustion engine with sufficient additional energy from the electric motor to start the internal combustion engine.

* * * * *